United States Patent
Carvajal et al.

(10) Patent No.: US 7,385,991 B2
(45) Date of Patent: Jun. 10, 2008

(54) INGRESS CELL PROCESSING AT A USER-NETWORK INTERFACE

(75) Inventors: Carlos G. Carvajal, Raleigh, NC (US); L. Grant Giddens, Raleigh, NC (US); Dieter H. Nattkemper, Raleigh, NC (US); Robert S. Kroninger, Wake Forest, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1167 days.

(21) Appl. No.: 10/154,586

(22) Filed: May 24, 2002

(65) Prior Publication Data

US 2003/0218985 A1    Nov. 27, 2003

(51) Int. Cl.
*H04L 12/28* (2006.01)
(52) U.S. Cl. ...................... 370/397; 370/493
(58) Field of Classification Search ............... 370/249
See application file for complete search history.

(56) References Cited

U.S. PATENT DOCUMENTS

| | | | |
|---|---|---|---|
| 5,550,821 A * | 8/1996 | Akiyoshi .................. 370/397 |
| 6,052,374 A | 4/2000 | Stephens | |
| 6,160,810 A | 12/2000 | Brodigan | |
| 6,198,745 B1 | 3/2001 | Brodigan | |
| 6,349,098 B1 | 2/2002 | Parruck et al. | |
| 6,388,990 B1 | 5/2002 | Wetzel | |
| 6,873,598 B2 * | 3/2005 | Powers et al. ............. 370/248 |
| 6,993,048 B1 * | 1/2006 | Ah Sue ..................... 370/493 |
| 7,016,947 B1 * | 3/2006 | Ah Sue ..................... 709/221 |
| 2001/0015978 A1 | 8/2001 | Blanset et al. | |
| 2002/0071440 A1 | 6/2002 | Cerami et al. | |

FOREIGN PATENT DOCUMENTS

WO    WO 01/26313 A1    4/2001
WO    WO 01/73987 A2    10/2001

OTHER PUBLICATIONS

Black, Uyless, "ATM Foundation for Broadband Networks", Prentice Hall, Chapter 10, pp. 241-255, 1995.
Rice, Liz, "Soft PVCS in an ATM Network", Data Connection Limited, Jan. 23, 2001, pp. 1-9.

* cited by examiner

Primary Examiner—Robert W. Wilson
(74) Attorney, Agent, or Firm—Fogg & Powers LLC

(57) ABSTRACT

A method for processing cells at a user-network interface with automatic identification of virtual circuit identifiers and a testing function is provided. The method includes distinguishing the source of the cell. When the cell is from a first source, the method tests the cell against at least one selected criteria. When at least one test determines the cell is invalid, the cell is marked. When the tests determine that the cell is valid, the method translates a virtual circuit identifier to a default setting and forwards the cell to a queue for further processing.

10 Claims, 3 Drawing Sheets

INGRESS CELL PROCESSING AT A USER-NETWORK INTERFACE

TECHNICAL FIELD

The present invention relates generally to the field of telecommunications, and, in particular, to ingress cell processing at a user-network interface.

BACKGROUND

The Internet enables communication of data and information between users at diverse locations throughout the world virtually instantaneously. The Internet is in widespread use and continues to grow in popularity and utility. Over the years, various systems have been developed to deliver high-speed access to the Internet. For example, some consumers subscribe to digital subscriber line (DSL) service through their local exchange carrier (telephone company) or other service provider. Other consumers gain high-speed connection to the Internet through their cable company or a satellite service provider.

The asymmetric digital subscriber line (ADSL) services that are being deployed throughout the world provide a "user to network interface" or UNI. Conventionally, an ADSL modem is connected to a digital subscriber line access multiplexer (DSLAM) via the UNI. The ADSL service is invoked by provisioning at least one virtual circuit. The virtual circuit needs to be provisioned from end-to-end (source to destination) and involves multiple network elements. The provisioning procedure is tedious and time consuming. Some modems and DSLAMs are configured to default to a single virtual circuit for each end user. In order for the ADSL service to be functional, both the ADSL modem and an associated DSLAM need to have a compatible ATM layer configuration. Existing networks that utilize virtual circuit connections and can be categorized as connection oriented, include but are not limited to asynchronous transfer mode (ATM), frame relay (FR) and multi-protocol label switching (MPLS).

The common network element deployment strategies typically consist of manually provisioning a permanent virtual circuit (PVC), default initializing a PVC, or implementing a signaling connection setup sequence for switched virtual circuits (SVC). The signaling connection setup sequence requires pre-provisioned signaling client/server entities in some of the elements. A combination of the above strategies may also be applied to the access network. The above described deployment strategies are labor intensive and can cause interoperability limitations between different vendor's equipment.

The assignee of the present application has developed a "plug and play" technique for automatically provisioning an ADSL modem. This technique is described in co-pending application Ser. No. 09/833,780, entitled "AUTOMATIC PERMANENT VIRTUAL CIRCUIT CONNECTION ACTIVATION FOR CONNECTION ORIENTED NETWORKS" (the Auto PVC Application). The text of the Auto PVC Application is incorporated herein by reference. The access node provisions the ADSL modem by learning the virtual channel identifier for the modem and creating a translation to a default virtual channel identifier provisioned at the access node.

DSL service is typically provided over an ATM network with a connection between a remote terminal (RT) and a central office terminal (COT). In ATM networks most of the monitoring occurs at the physical layer, meaning that the individual units, e.g. ATM switches, LAN switches, remote terminals, and end units, in the network provide alarms or other error message when problems with physical transmission are determined. However, physical layer monitoring does not monitor the virtual channels at the ATM layer, specifically the queuing, routing and translation functions that provide the virtual channel functionality through different elements in the network. Since ATM and DSL connections have extremely high throughputs the inability to test the channel as a whole or in part can result in missing translation or routing problems that can result in cells being transmitted along incorrect virtual channels.

In addition, ATM utilizes Operations and Maintenance (OAM) layer functions to perform testing at the ATM adaptation layer (AAL). OAM cells are injected to test either virtual paths or provisioned virtual channels and can be sent from the testing apparatus to an end point or can be looped back between any two ATM nodes along the virtual path or virtual channel. However, OAM cells are limited to ATM links in the network and generally require processing capability in each of ATM switches or end units that the OAM cell passes because the cell identity is contained in the cell payload and these cells cannot be readily distinguished from data cells. This increases the cost of the equipment needed for the end points that in turn drives up the overall cost of the ATM system.

The assignee of the present application has provided a solution to this monitoring problem as described in co-pending application Ser. No. 10/093,296, entitled "EMBEDDED CELL LOOPBACK METHOD AND SYSTEM FOR TESTING IN ATM NETWORKS" (the "ECLP application"). The text of the ECLP Application is incorporated herein by reference. Essentially, the ECLP Application provides for testing the functionality of the ATM layer using specially inserted cells. These cells include special codes stored in a field such as the GFC field.

Unfortunately, use of automatic provisioning for ADSL modems as taught in the Auto PVC application in an access node that supports an embedded cell loop-back protocol as taught in the ECLP patent can result in transmission errors. For example, miss-inserted cells may be improperly interpreted as ECLP cells or may be routed improperly when received at the user-network interface.

Therefore, there is a need in the art for improvements to ingress cell processing at the user-network interface in access network equipment.

SUMMARY

Embodiments of the present invention allow use of automatic provisioning for ADSL modems in a system that supports embedded cell loop-back testing by providing an ingress cell technique at a user-network interface that accounts for these two features. Specifically, cells are tested, in both the upstream and downstream direction to detect and mark potentially miss-inserted cells prior to passing the cells upstream, e.g., to a queue for a transmission scheduler.

In one embodiment, a method for processing cells at a user-network interface with automatic identification of virtual circuit identifiers and a testing function is provided. The method includes distinguishing the source of the cell. When the cell is from a first source, the method tests the cell against at least one selected criteria. When at least one test determines the cell is invalid, the cell is marked. When the tests determine that the cell is valid, the method translates a virtual circuit identifier to a default setting and forwards the cell to a queue for further processing.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the invention described herein apply to virtual circuit connections for connection-oriented networks including but not limited to asynchronous transfer mode (ATM), frame relay (FR) and multi-protocol label switching (MPLS). Networks of this type utilize virtual circuit connections that have local significance on a communications link. An "end to end" virtual connection is created by the network elements that translate the virtual circuit connection identifier (VCCI) values to the required value for the next link.

The naming convention for the "virtual circuit connection" varies for each network protocol. The definition of the "virtual circuit connection" herein is a communications method on any communications link that supports a connection oriented address structure which permits multiplexing more than one communication session onto one physical link. In addition, the "virtual circuit connection" does not consume communication link bandwidth when the given communications session is idle. When it is necessary to reference the address field of any given network protocol that supports "virtual circuit connections" then the term "virtual circuit identifier" is utilized.

Figure 1:
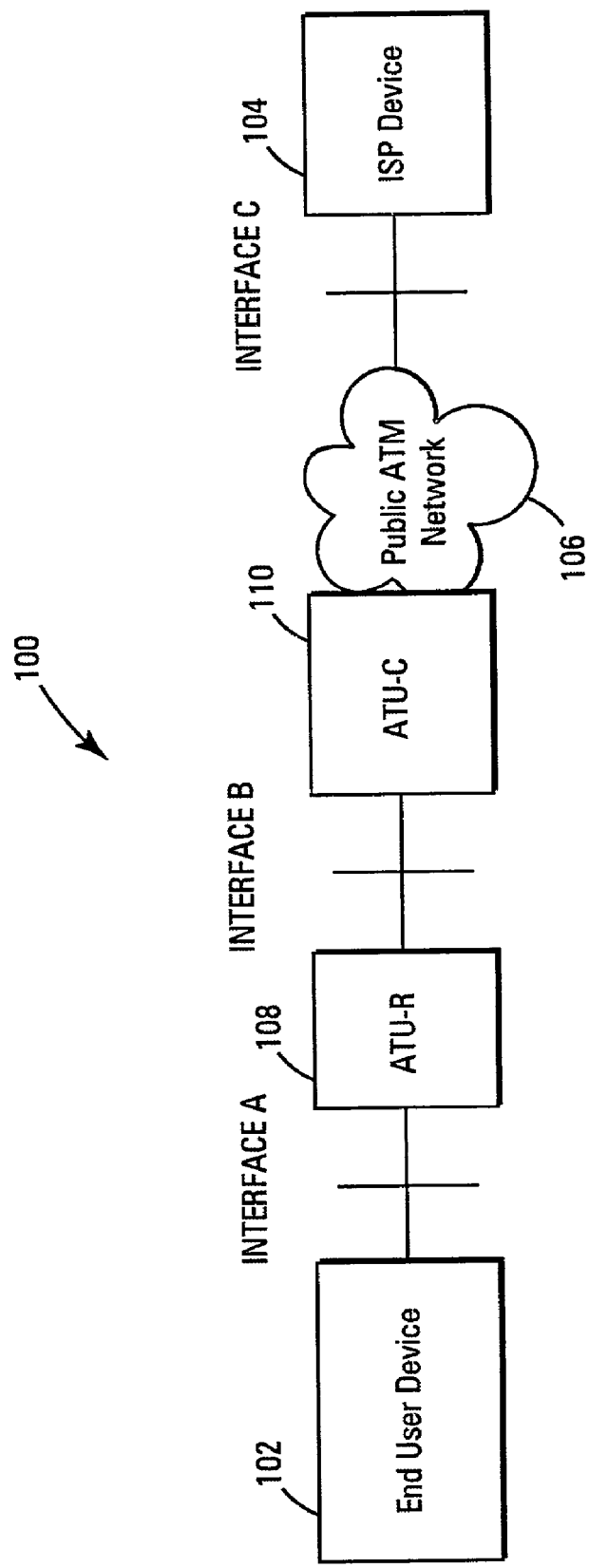
FIG. 1 is a block diagram of a communication system including an improved ingress cell processing protocol according to the teachings of the present invention.

FIG. 1 is a block diagram of a communication system, indicated generally at 100, including an improved ingress cell processing protocol according to the teachings of the present invention. Communication system 100 provides communication between end user device 102 and Internet service provider (ISP) device 104 over ATM network 106. To accomplish this communication, system 100 includes a remote DSL termination unit (ATU-R) 108 and central office DSL termination unit (ATU-C) 110.

Various interfaces are provided and identified in system 100. The first interface, labeled as interface A, is between end user device 102 and ATU-R 108. Interface A is a private user-network interface (UNI). The second interface, labeled as interface B, is between ATU-R 108 and ATU-C 110. Interface B is a public user-network interface. Finally, interface C is between ATM network 106 and ISP device 104 and is either a public UNI or a public network-network interface (NNI).

System 100 combines at least two features not found together in existing systems. First, system 100 includes an automatic provisioning feature. Specifically, in one embodiment, system 100 provides for automatic provisioning of PVCs at interface B according to the teachings of the Auto PVC application. Further, system 100 incorporates an embedded procedure for testing at the ATM layer. In one embodiment, testing is accomplished at the ATU-C 110 through an embedded cell loop-back protocol according to a technique described in the ECLP application. To prevent improper interpretation of cells received at ATU-C 110 due to the use of these two features, an ingress cell processing technique such as described below with respect to FIG. 2 is implemented.

Figure 2:
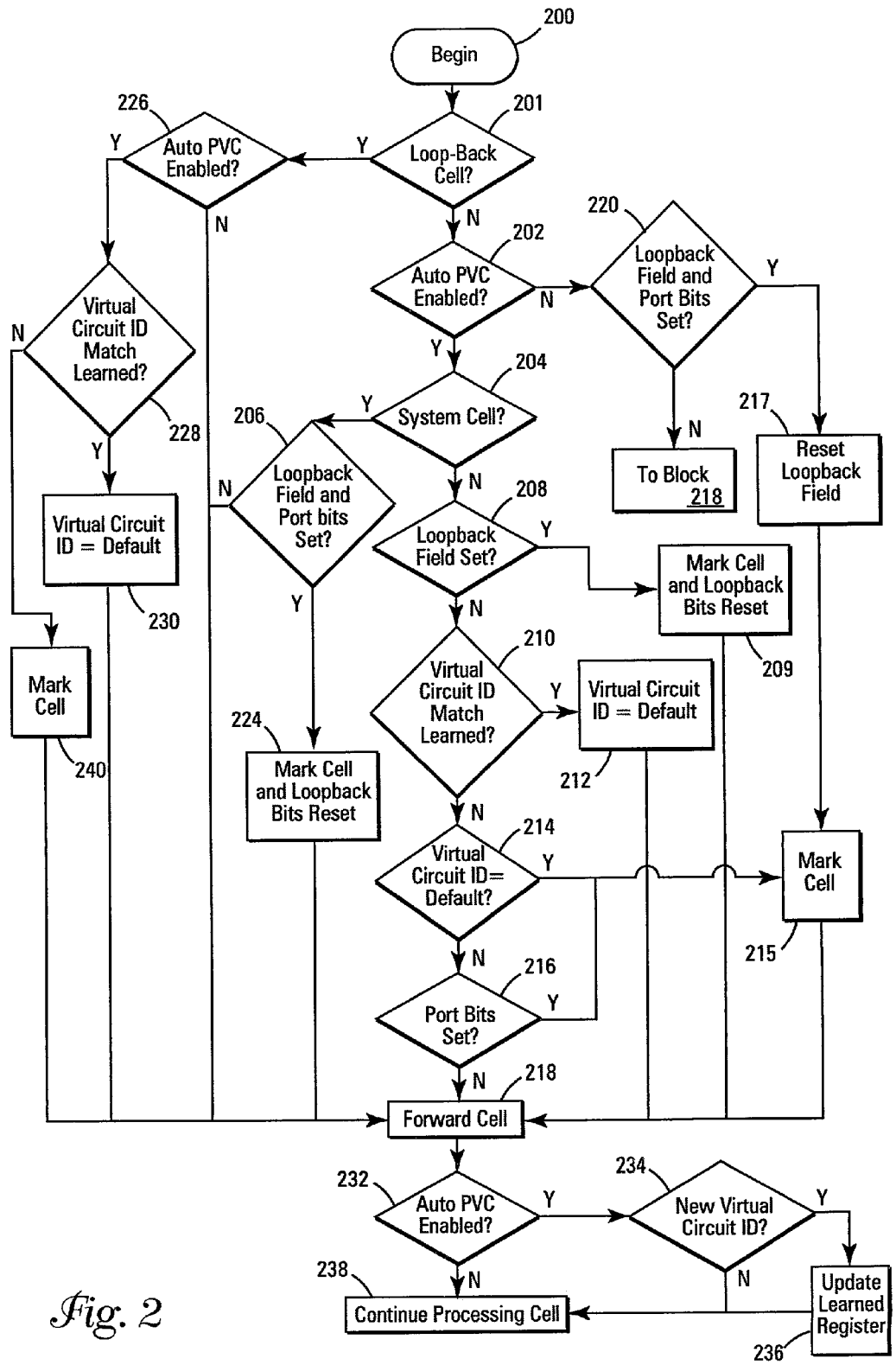
FIG. 2 is a flow chart of an embodiment of a process for handling ingress cells in an upstream direction at a user-network interface according to the teachings of the present invention.

FIG. 2 is a flow chart of an embodiment of a process for handling ingress cells in an upstream direction at a user-network interface, e.g., interface B of FIG. 1, according to the teachings of the present invention. In this embodiment, ingress cells are provided to access equipment, e.g., ATU-C 110, from at least two sources. First, upstream cells are received from customer premises equipment (CPEs), e.g., end user device 102, connected to the access network. Additionally, loop-back cells are received from a segment test function as described in the ECLP application.

The method begins at block 200. At block 201, the method determines the source of a cell received at the access node. If the cell is not a loop-back cell, the method proceeds to block 202 and determines if automatic provisioning of PVCs is enabled. If the function is enabled, the method proceeds to block 204 and begins to test the cell to determine if it is a valid cell. If the cell is determined to be an invalid cell, the method will mark the cell so that it is not improperly handled. For example, the method tests cells against various criteria to identify whether a corrupted cell would be mis-interpreted as a loop-back test cell or a cell from an auto-provisioned source. In one embodiment, marking a cell comprises setting a virtual circuit identifier to a selected value, e.g., setting VP/VC values to 0/31. This will allow later processing to identify the cell as miss-inserted.

One test determines whether the cell has an invalid virtual circuit identifier. In one embodiment, at block 204, the method determines whether a virtual channel (VC) value of the virtual circuit identifier has a reserved value. For example, in one embodiment, the method determines whether the VC value is greater than 31. VC Values less than 32 are reserved and thus, if the VC for the cell is not greater than 31, the method proceeds to block 206 for further processing as described below. If, however, the VC value is valid, the method proceeds to block 208.

At block 208, the method determines whether the cell has an acceptable value in a field reserved for loop-back testing. In one embodiment, loop-back testing uses the GFC field. As described in the ECLP application, the GFC field is normally zero unless the cell is a loop-back test cell. Therefore, in one embodiment, the test determines whether the GFC field is non-zero. Since only loop-back cells should have non-zero GFC fields, the method marks the cell at block 209 if the field is non-zero since in this branch of the method the cell is known to not be a loop-back cell. Further, the method sets the GFC field to zero. If, at block 208, the GFC field has a zero value, the method proceeds to block 210.

At block 210, the method determines whether the virtual channel identifier matches a learned value. If so, the cell is valid and can be passed for further processing. A translation is accomplished to the default value at block 212.

If the cell does not match the learned value at block 210, it is possible that the cell is a miss-inserted cell. Therefore, at block 214, the method further tests the cell to determine if the cell has a virtual channel identifier that is equal to the default virtual channel identifier used in the translation. If so, the cell is also marked at block 215 because it is an invalid cell. Otherwise, the method proceeds to block 216.

At block 216, the method further tests the cell to determine whether bits used to identify the port of origin of a cell are set (port bits). In one embodiment, the VP[3 . . . 1] bits are used to identify the port that originated an ingress cell. These port bits are only set to a non-zero value after the ingress cell is processed by this method. Thus, if this value is not zero in a cell received at the access node, the cell is marked at block 215 to avoid problems upstream. After the method is completed, the VP[3 . . . 1] bits are modified according to Table 1 to identify the port of origin at block 238.

TABLE 1

| VP[3 . . . 1] | Port No. |
|---|---|
| 000 | 0 |
| 001 | 1 |
| 010 | 2 |
| 011 | 3 |
| 100 | 4 |
| 101 | 5 |
| 110 | 6 |
| 111 | 7 |

In this embodiment, decision block 210 precedes decision blocks 214 and 216. Advantageously, this order of testing does not improperly mark cells as invalid when, for example, a learned virtual circuit identifier is the same as the default virtual circuit identifier or when a learned virtual circuit identifier has a one or more of the port bits set. Thus, the method first determines whether the virtual circuit identifier is equal to the learned virtual circuit identifier and then, only if the virtual circuit identifier is not equal to the learned virtual circuit identifier, does the method proceed with the further tests.

When automatic provisioning of PVCs is not enabled at block 202, the method proceeds to block 220 and tests the loop-back field and port bits. In this branch of the method, tests for conflicts with the auto-provisioning are not necessary. Therefore, if the loop-back bits are not set and the port bits are not set, the method proceeds to block 218 for further processing of the cell. If, however, either of these fields or bits is set, then the method proceeds to block 217 and resets the loop-back field, e.g., sets the field to zero, and marks the cell at 215.

When the received cell is determined to be a loop-back cell at block 201, the method proceeds to block 226 and determines whether the Automatic provisioning of PVCs is enabled. If not, the method proceeds to block 218 since there are no error conditions to check for with the loop-back cell. If, however, Automatic provisioning of PVCs is enabled, the method determines whether the virtual circuit identifier matches a learned virtual circuit identifier value at 228. If not, the method proceeds to mark the cell at block 240 and forward the cell at block 218. If however, the value matches the learned virtual circuit identifier, the method translates the value to the default value at 230.

When the received cell is determined to have an invalid virtual circuit identifier value at block 204, the method determines whether the loop-back field and the port bits are set. If not, the method proceeds to forward the cell at block 218 since the cell is a valid system cell. If, however, the port bits or the loop-back field are set the method proceeds to block 224 and marks the cell and resets the loop-back field and the port bits. The method proceeds to forward the cell at block 218.

From block 218, the method proceeds to block 232. If automatic provisioning of PVCs is enabled, the method determines whether a new virtual circuit identifier has been learned at block 234 and updates the registers as necessary at block 236. The method proceeds to block 238 and places the cell in a queue for further processing by, for example, a transmission scheduler. If no new virtual circuit identifier is learned, the method also proceeds directly to block 238.

Figure 3:
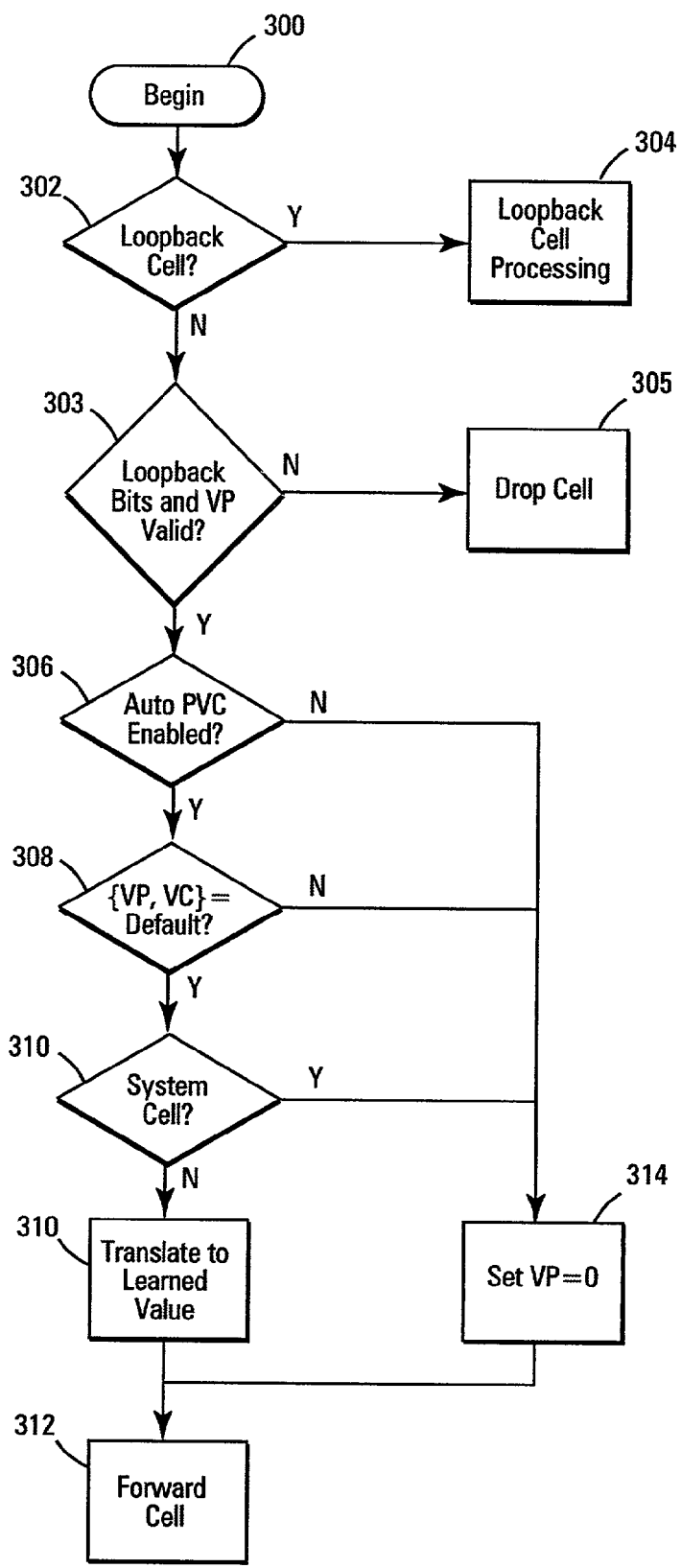
FIG. 3 is a flow chart of an embodiment of a process for handling ingress cells in a downstream direction at a user-network interface according to the teachings of the present invention.

FIG. 3 is a flow chart of an embodiment of a process for handling ingress cells in a downstream direction at a user-network interface according to the teachings of the present invention. The method begins at 300. At block 302, the method determines whether the cell is a loop-back cell. In one embodiment, this is determined based on the value of the GFC field as described in the co-pending ECLP Application. For example, if the GFC field has a hexadecimal value of 9, B, or D then the cell is a loop-back cell and is processed at block 304 according to the technique described in the ECLP Application and forwarded to the appropriate queue for further processing. If the GFC field has some other value, the method proceeds to block 303.

At block 303, the method determines if the GFC and VP fields are valid. In one embodiment, the method tests the loop-back field by determining whether the GFC field is set to zero. Further, in one embodiment, the method tests the VP portion of the virtual circuit identifier by determining whether the VP[7 . . . 4] bits are zero. If the loop-back field is not zero or the VP value is invalid, the method drops the cell at block 305. If the loop-back field is set to the selected value and the VP value is valid, the method proceeds to block 306 and continues to process the cell as a valid cell.

At block 306, the method determines whether Automatic provisioning of PVCs is enabled. If not, the method proceeds to block 314 and sets the VP value of the virtual circuit identifier to zero and leaves the VC of the virtual circuit identifier value unchanged. If Automatic provisioning of PVCs is enabled, the method proceeds to block 308 and determines whether the virtual circuit identifier, e.g., VPNC values, equal the default value. If not, the method proceeds to block 314. If so, the method proceeds to block 310.

At block 310, the method determines whether the cell is a system cell. In one embodiment, this is accomplished by checking the VC portion of the virtual circuit identifier, e.g., system cells have a VC value between 0 and 31. If the cell is a system cell, the method proceeds to block 314. If the cell is not a system cell, the method proceeds to block 312. At block 312, the method translates the virtual circuit identifier to the learned value and forwards the cell.

What is claimed is:

1. A method for processing cells at a user-network interface with automatic identification of virtual circuit identifiers and a testing function, the method comprising:
distinguishing the source of the cell, wherein distinguishing the source of the cell comprises determining whether the cell is one of a loop-back cell from the testing function and a cell from an auto-provisioned source;
when the cell is from an auto-provisioned source,
testing the cell against at least one selected criteria;
when at least one test determines the cell is invalid, marking the cell;
when the tests determine the cell is valid, translating a virtual circuit identifier to a default setting; and forwarding the cell to a queue for further processing.

2. The method of claim 1, wherein testing the cell against at least one selected criteria comprises:
    determining whether the virtual circuit identifier for the cell is within a range of virtual circuit identifiers reserved for system cells;
    determining whether a field of the cell has a value reserved for cells from a second source; and
    determining whether the cell has a learned virtual circuit identifier.

3. The method of claim 2, and further comprising:
    identifying the cell as invalid when the virtual circuit identifier is outside the valid range;
    identifying the cell as invalid when the field has a value reserved for cells from the second source; and
    identifying the cell as valid when the virtual circuit identifier is equal to a learned value.

4. The method of claim 2, and further comprising: identifying the cell a system cell when the virtual circuit identifier has a virtual channel less than 32;
    identifying the cell as invalid when a field used in loop-back testing has a non-zero value; and
    identifying the cell as valid when the virtual circuit identifier is equal to a learned value.

5. The method of claim 2, and further comprising, when the cell does not have a learned virtual circuit identifier, further determining whether the cell has a default virtual circuit identifier.

6. The method of claim 5, and further comprising, when the cell does not have a default virtual circuit identifier, further determining whether a virtual path portion of the virtual circuit identifier has a valid value.

7. A method for processing cells at a user-network interface, the method comprising:
    determining when the cell is a loop-back cell received from a test function;
    when the cell is not a loop-back cell,
        testing the cell against at least one selected criteria;
        when at least one test determines the cell is invalid, marking the cell;
        when at least one test determines the cell matches a learned virtual circuit identifier, translating a virtual circuit identifier to a default setting; and
    forwarding the cell to a queue for further processing.

8. A method for processing cells at a user-network interface, the method comprising:
    determining when the cell is a loop-back cell received from a test function;
    when the cell is not a loop-back cell,
        testing the value of the virtual channel,
            when the virtual channel is greater than 31, testing a field used by the loop-back test function,
            when the field used by the loop-back test function has a value in a first range, marking the cell as invalid,
            when the field used by the loop-back test function has a value in a second range, determining whether the virtual circuit identifier matches a learned value,
            when virtual circuit identifier matches the learned value, translating a virtual circuit identifier to a default setting,
            when the virtual circuit identifier does not match the learned value, further testing the cell, and
        marking the cell when the cell is invalid; and
    forwarding the cell to a queue for further processing.

9. The method of claim 8, wherein further testing the cell comprises:
    determining whether the virtual circuit identifier matches a default value;
    when the virtual circuit identifier matches the default value, marking the cell;
    determining whether the virtual path for the cell falls within a first range; and
    marking the cell when the virtual path falls in the first range.

10. A method for processing cells at a user-network interface, the method comprising:
    determining when the cell is a loop-back cell received from a test function;
    when the cell is not a loop-back cell,
        testing the cell against at least one selected criteria;
        when at least one test determines the cell has a value associated with loop-back cells, marking the cell;
        when at least one test determines the cell matches a learned virtual circuit identifier, translating a virtual circuit identifier to a default setting; and
    forwarding the cell to a queue for further processing.

* * * * *